United States Patent [19]

Yoshida et al.

[11] Patent Number: 5,044,481
[45] Date of Patent: Sep. 3, 1991

[54] APPARATUS FOR ADJUSTMENT OF KNOCK-OUT TIMING FOR PRESS

[75] Inventors: Takeshi Yoshida; Yoshinori Goto, both of Sagamihara, Japan

[73] Assignee: AIDA Engineering Ltd., Sagamihara, Japan

[21] Appl. No.: 553,379

[22] Filed: Jul. 17, 1990

[30] Foreign Application Priority Data

Jul. 28, 1989 [JP] Japan ............................... 1-88742[U]

[51] Int. Cl.⁵ ...................... F16D 11/00; F16D 25/061
[52] U.S. Cl. ................................ 192/67 R; 74/568 R; 192/91 A
[58] Field of Search .................. 74/568 R, 571 M; 192/20, 91 A, 67 R

[56] References Cited

U.S. PATENT DOCUMENTS

| | | | |
|---|---|---|---|
| 1,580,178 | 4/1926 | Talbot | 74/568 |
| 1,706,791 | 3/1929 | Leighton | 192/67 R X |
| 2,246,208 | 6/1941 | Hobbs | 74/568 FS X |
| 2,382,765 | 8/1945 | Zahodiakin | 74/568 X |
| 2,635,727 | 4/1953 | Bitler | 192/67 R |
| 3,504,564 | 4/1970 | Kell | 192/67 R X |
| 4,961,669 | 10/1990 | Itoh et al. | 192/113 B X |

Primary Examiner—Rodney H. Bonck
Attorney, Agent, or Firm—Spencer & Frank

[57] ABSTRACT

A press machine includes a first rotary shaft which rotates in synchronism with a press crankshaft, a second rotary shaft which is coaxial with the first shaft and which has a drive cam for actuating a knock-out pin, and a clutch for connecting and disconnecting the first and second shafts. Knock-out timing is adjusted by releasing the clutch to separate the shafts and rotating one of the shafts through a predetermined angle relative to the other to produce a predetermined rotational phase difference between them. In the preferred embodiments, the second shaft is axially aligned with the first shaft, and is rotatable but axially immovable with respect to the press frame. A driving gear and a driven gear are provided between adjacent portions of the first and second shafts. The second shaft has a bore in which a lightweight, axially movable shaft is mounted. This movable shaft carries at one end a connector gear which is engageable with the driving and driven gears between the first and second shafts and which, together with the driving and driven gears form the clutch. A connector is provided for engaging the clutch and a separator is provided for disengaging clutch. The first and second shafts are separated by displacing the movable shaft and the connecting gear therewith with the use of the separator to disconnect the driving gear from the driven gear.

9 Claims, 5 Drawing Sheets

APPARATUS FOR ADJUSTMENT OF KNOCK-OUT TIMING FOR PRESS

REFERENCE TO RELATED APPLICATIONS

This application claims the priority of Japanese application serial No. JP 1-88742.

BACKGROUND OF THE INVENTION

The invention relates to a knock-out mechanism for a press machine, and more particularly to such a device which includes apparatus for changing the timing of operation of the knock-out mechanism.

FIG. 6 illustrates a conventional knock-out mechanism on which a rotary shaft 1, in order to rotate synchronously with a press crankshaft, is integrally connected to a cam 3 by a key 2, and a lever 5 rotatably mounted by a supporting axle 4 has a roller 6 at one end thereof which contacts the cam 3. A pin 7 at the other end of the lever 5 is connected to one end of a knock-out rod 8.

The knock-out rod 8, in order to actuate a knock-out pin 9, is connected at its other end via a pin 10 to a lever 12 which is in turn mounted on a rotatable supporting axle 11.

A pin 14 links the knock-out pin 9 to a lever 13 which is mounted to the supporting axle 11 in the same manner as the lever 12. A cylinder unit for ensuring engagement between the cam 3 and the roller 6 includes a cylinder 15 which is mounted at one end to the press frame. The cylinder unit also includes a piston rod 16 which projects from the cylinder 15 to be linked with the lever 12 by a pin 17.

In the above prior art knock-out mechanism, the knock-out pin 9 travels within a die (a lower die in this case) to knock out a formed article, with the motion of the stroke being defined by the shape of the cam 3 rotated with the rotary shaft 1. Accordingly, the operator must choose a press machine suitable for the workpiece to be formed and also a knock-out unit which is adapted thereto so as to provide a stroke with an appropriate motion.

Further, circumstances may arise in which the knock-out timing must be changed in consideration of the manner of forming, in consideration of the workpiece to be shaped and in consideration of the transfer of workpiece. According to the prior art such as is illustrated in FIG. 6, however, in which the rotary shaft 1 is integrally connected to the cam 3 by the key 2, changing the knock-out timing by altering the rotational phase relationship between the cam and the rotary shaft is difficult. Inevitably, improper knock-out timing will result in products of inferior quality. On the other hand, while changing the knock-out timing by preparing various cams and choosing one suitable for the particular work to be performed may be possible, such an approach is inefficient and economically disadvantageous because it required much time and labor in order to exchange cams.

SUMMARY OF THE INVENTION

An object of the present invention is to overcome the above described problems of the prior art by providing an apparatus which can precisely and speedily adjust the knock-out timing of a press machine.

A press machine according to the invention includes a first rotary shaft which rotates in synchronism with a press crankshaft, a second rotary shaft which is coaxial with the first rotary shaft and which has a drive cam for actuating a knock-out pin, and a clutch means for connecting and disconnecting the first and second rotary shafts. The knock-out timing is adjusted by releasing the clutch to separate the shafts and rotating one of the shafts through a given angle relative to the other to produce a predetermined rotational phase difference between them.

In the preferred embodiment, the second rotary shaft is is rotatable but axially immovable with respect to the press frame. A driving gear and a driven gear are provided between adjacent portions of the first and second rotary shafts. The second rotary shaft has a bore in which a lightweight, axially movable shaft is mounted. This movable shaft carries at one end a connector gear which is engageable with the driving and driven gears and which, together with the driving and driven gears, form the clutch. A connector means is provided for engaging the clutch and a separator means is provided for disengaging clutch. The first and second rotary shafts are separated by displacing the movable shaft and the connecting gear therewith with the use of the separator means to disconnect the driving gear from the driven gear. In this condition, either the first or the second rotary shaft is advanced or delayed in rotation by a predetermined angle, enabling a relative change to occur in the rotational positions of the first rotary shaft and the second rotary shaft. Thereafter, the movable shaft is again displaced with the use of the connector means to re-connect the driving and driven gears and thus the first and second rotary shafts together, with the predetermined phase difference now established between them. Thus, the invention can adjust the knock-out timing by adjusting the rotational phase difference between the first and second rotary shafts.

Since neither a mechanical alteration, such as an exchange of different types of cams, nor an axial displacement of either of the first and second rotary shafts is necessary to adjust the knock-out timing according to the invention, but rather only displacement of a movable shaft which is smaller and has a lighter weight than the rotary shafts is required, an easy and speedy adjustment of timing can be performed according to the invention. Moreover the adjustment can be economically made with only a minimum use of power and an apparatus which is relatively modest in size and complexity. Further, the invention provides an apparatus capable of performing the knock-out in a manner which is optimum for the press machine, the manner of forming, the workpiece to be formed, etc., thus facilitating an improvement in quality and an increase in productivity.

BRIEF DESCRIPTION OF THE DRAWINGS

These and other features and advantages of the invention can be more completely understood from the following detailed description with reference to the accompanying drawings in which.

DETAILED DESCRIPTION OF THE PREFERRED EMBODIMENTS

The preferred embodiments of the invention will be described hereinafter with reference to the drawings.

Figure 1:
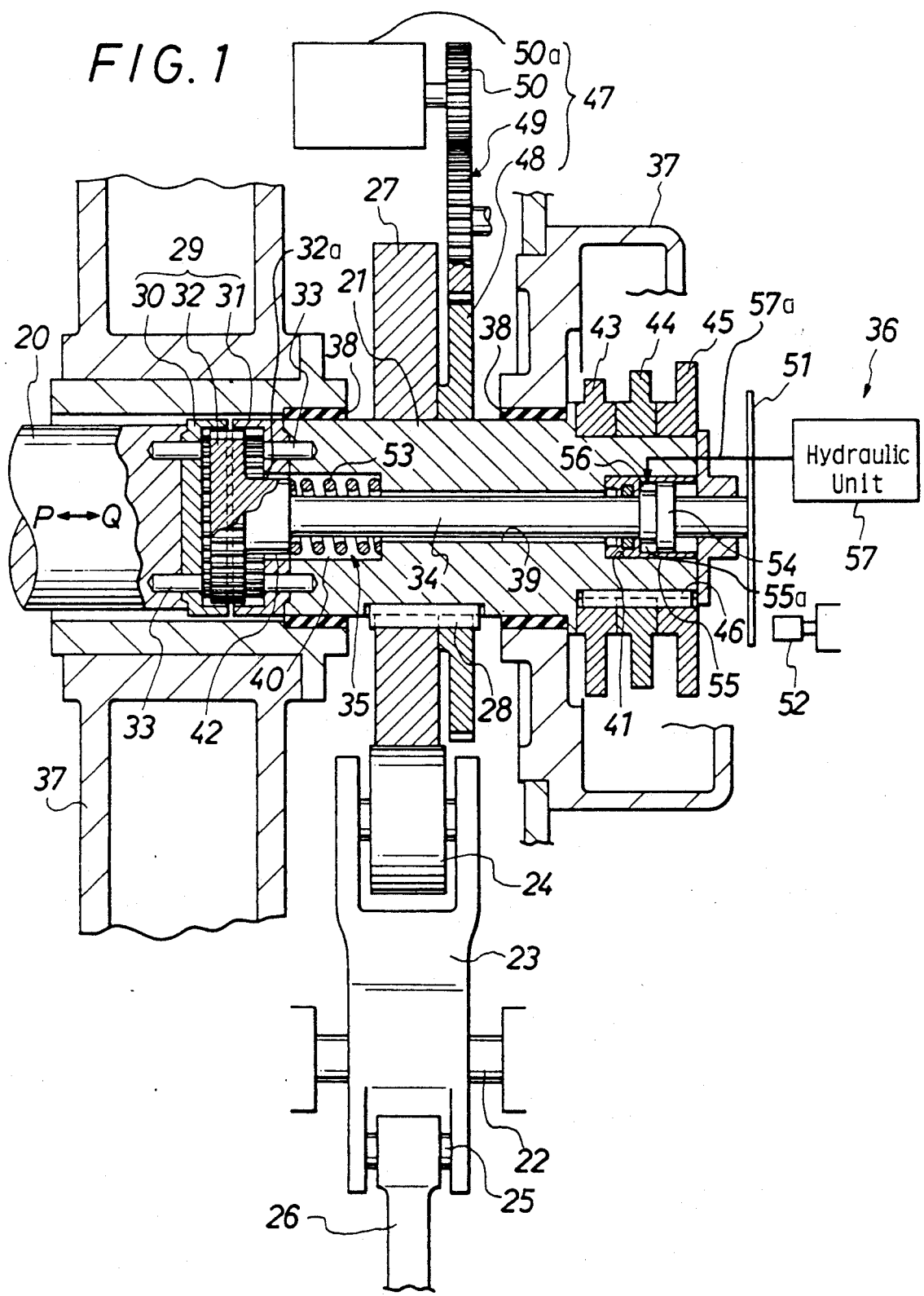
FIG. 1 is a partially sectional and partially schematic view of a portion of a press machine according to one embodiment of the present invention.

FIG. 1 shows a first embodiment which includes a first rotary shaft 20, a second rotary shaft 21, a drive cam 27 held on the shaft 21 by a key 28, a clutch 29 for connecting and disconnecting the first and second rotary shafts 20 and 21, a connector means 35 and a separator means 36. The clutch 29 is controlled through the connector means 35 and separator means 36 by a control unit as will be described below.

As is the case with the conventional mechanism, the knock-out unit in the embodiment has a roller 24 linked with the drive cam 27. The roller 24 is provided at one end of a lever 23. The lever 23 is rotatably mounted to the frame 37 of the press by a supporting axle 22. A knock-out rod 26 is pivotally connected to the other end of the lever 23 by a pin 25. Reciprocating movement of the knock-out rod 26 drives a knock-out pin, not shown, to knock out the workpiece from a lower die of the press. The rotational phase of the second rotary shaft 21 and through it the drive cam 27 relative to the first rotary shaft 20 defines the knock-out timing. The components below the knock-out rod 26, which are also conventional, are omitted from illustration in FIG. 1 for the sake of simplicity.

Firstly, constituent elements of the overall adjustment apparatus will be described generally. The first rotary shaft 20 is supported by a frame so that it rotates synchronously with a press crankshaft. The second rotary shaft 21 is adapted to rotate together with the drive cam 27 by the key 28. The first and second rotary shafts 20 and 21 are so formed that they can be connected and disconnected.

The clutch 29 comprises a driving gear 30 mounted to the first rotary shaft 20, a driven gear 31 mounted to the second rotary shaft 21 in opposition to the first rotary shaft 20, and a connector gear 32 for connecting the gears 30 and 31. The gears 30 and 31 are internal gears with a narrow space between them. The gears 30 and 31 may be formed integrally with ends of the rotary shafts 20 and 21, but preferably they are mounted thereat by pins 33 so that they can be replaced as needed. The connector gear 32 may be an external gear linked with a movable shaft 34. The connector gear 32 shifts axially in the directions P and Q to respectively connect and disconnect the gears 30 and 31 (engage and disengage the clutch 29).

The connector means 35 displaces or shifts the movable shaft 34 together with the connector gear 32 in the direction P to connect the driving and driven gears 30 and 31. The separator means 36, on the other hand, displaces or shifts the movable shaft 34 and the connector gear therewith in the direction Q to disconnect the driving gear 30 from the driven gear 31 and thereby separate the second rotary shaft 21 from the first rotary shaft 20. A brake means, not shown, is provided to prevent the first rotary shaft from rotating when the gears 30 and 31 are disconnected, in order to permit relative rotation between the first rotary shaft 30 and the second rotary shaft 31 carrying the drive cam 27.

A unit 47 for rotating the second rotary shaft 21 when it is separated from the first rotary shaft 20, comprises a driven gear 48 on the second shaft 21, a gear series 49 including a drive gear 50, and a motor 50a for rotating the drive gear 50. A control unit 60 (FIG. 4) automatically advances or delays rotation of the second rotary shaft 21 (and the drive cam 27 therewith) by rotating the shaft 21 with the motor 50a through a predetermined angle relative to the first rotary shaft 20 while the shafts 20 and 21 are separated.

To change the knock-out timing, the separator means 36 is actuated with a control unit 60 (FIG. 4) to displace the movable shaft 34 in the direction Q so that the first rotary shaft 20 is separated from the second rotary shaft 21 and kept by the brake means from freely rotating. Then, while the shafts 20 and 21 are separated, the control unit 60 automatically advances or delays rotation of the second rotary shaft 21 (and the drive cam 27 therewith) by rotating the shaft 21 with the motor 50a through a predetermined angle, for example advanced by five degrees, relative to the first rotary shaft 20. Thereafter, the connector means 35 is actuated again to put the clutch 29 into engagement by connecting the driving and driven gears 30 and 31 with the connector gear 32 to connect the two rotary shafts while keeping the rotational phase difference established by the previous rotation of the second rotary shaft 21 relative to the first rotary shaft 20. Therefore, in this way a change in the relative rotational phase of the first and second rotary shafts is performed so that a corresponding adjustment of the knock-out timing is obtained.

The embodiment of FIG. 1 is now described in further detail. The first rotary shaft 20 rotates synchronously with the drive shaft, e.g. a crankshaft of the press, and is mounted rotatable to the frame 37 which forms a crown. At the end of the first rotary shaft 20 opposing the second rotary shaft 21, the driving gear 30 is disposed concentrically with the axis of the first rotary shaft 20 and can be an internal gear.

The second rotary shaft 21 carrying the drive cam 27 for actuating the knock-out mechanism is rotatably and axially immovably mounted to the frame 37 by a bushing 38. The second rotary shaft 21 is disposed in concentric alignment with the first rotary shaft 20 and is formed in a cylindrical shape with a bore 39 therein. The bore 39 has stepped openings or recesses 40 and 41 at its respective ends. The recess 40 is larger and contains the connecting means 35; the recess 41 forms a chamber in which a cylinder is disposed as will be described below.

The internal driving and driven gears 30 and 31 are concentrically carried by the respective first and second rotary shafts 20 and 21. The connector gear 32 is an external gear and has a boss 32a. The driven gear 31 has a hole 42 larger in diameter than that of the boss 32a, permitting the connector gear 32 to slide axially.

The second rotary shaft 21 also carries via a key 46 a set of cams for driving transfer mechanisms, namely a first cam 43 for clamping and unclamping feed bars, a second cam 44 for moving the feed bars up and down, and a third cam 45 for advancing and returning the feed bars.

Further, the drive motor 50a of the rotating means 47 can alternatively rotate in forward and reverse directions to rotate the second rotary shaft 21 by a predetermined positive or negative angle through the gears 49 and 48 when the shaft 21 is separated from the shaft 20, the gear 48 being fixed to the second rotary shaft 21.

The movable shaft 34 is movable in the axial directions P and Q within the bore 39 of the second rotary shaft 21. Preferably, the movable shaft 34 is as small and lightweight as possible while having adequate strength to perform its specified functions. The connector gear 32 is an external gear wheel which is concentrically mounted to the movable shaft 34 and moves axially in the direction P in sliding engagement with the driven gear 31. The connector gear 32 has sufficient thickness in the axial direction so as to be capable of also engaging the driving gears 30 at its outer end while maintaining an engagement with the driven gear 31 at its inner end, thereby to connect the gears 30 and 31. The connector gear 32 can connect the driving and driven gears 30 and 31 at incrementally different relative rotational angles defined by the pitch of the gears, for example every five degree of phase difference in the rotational angle. The connector gear 32 can of course also move axially in the direction Q from the engagement with the gears 30 and 31 so as to be released from the driving gear 30. Consequently, the gears 30 and 31 are disconnected from each other, resulting in disengagement of the clutch 29. The connector gear 32 is preferably as small and lightweight as possible while having sufficient strength to perform its specified functions, e.g. to transmit sufficient drive force between the gears 30 and 31 to allow the workpiece to be knocked out via the knock-out rod.

The movable shaft 34 has a diameter slightly smaller than the diameter of the bore 39 of the second rotary shaft 21 so that the shaft 34 can slide smoothly in the axial direction. An oil passageway, not shown, extends from the first rotary shaft 20 into the movable shaft 34, permitting lubricating oil to be supplied into the second rotary shaft 21 and other parts. The end of the movable shaft 34 opposite that bearing the connector gear 32 protrudes from the second rotary shaft 21 and carries a disk 51. A detector 52 is disposed in opposing spaced relation to the disc 51 and is adapted to detect the relative position of the disk 51 so as to take on either an OFF condition or an ON condition.

When the connector gear 32 is engaged with the driving gear 30 so that the movable shaft 34 has been moved in the direction P, the detector 52 detects that the disc 51 has been moved to a position relatively separated therefrom and takes on the OFF condition. On the other hand, when the connector gear 32 is disengaged from the driving gear 30 so that the movable shaft 34 has been moved in the direction Q, the detector 52 detects that the disc 51 has been moved to a position relatively close thereto and takes on the ON condition. Therefore, connection and disconnection of the gears 30 and 31 can be detected by the detector 52.

The connector means 35 for engaging the clutch 29 serves to move the shaft 34 so that the connector gear 32 links the gears 30 and 31. In the preferred embodiments, the connector means 35 is a biasing means or spring 53. The spring 53 surrounds the movable shaft 34 and extends from the bottom of the larger recess 40 of the second rotary shaft 21 to the end surface of the boss 32a. As a result, the connector gear 32 carried by the movable shaft 34 is biased by the spring 53 in the direction P toward meshing engagement with both of the gears 30 and 31 as shown in FIG. 1, resulting (in the absence of a counter force) in a connection between the gears 30 and 31 through the connector gear 32. Since the outside diameter of the movable shaft 34 is somewhat smaller than the inside diameter of the bore 39 in the second rotary shaft 21, the movable shaft 34 can slide smoothly in the direction P. The spring 53 can be small sized since the movable shaft 34 and the connector gear 32 are small and lightweight and therefore can be moved with a small elastic force.

The separator means 36 for releasing the clutch 29 actuates the movable shaft 34 so as to disconnect the gears 30 and 31 from each other. In the preferred embodiments, the separator means includes a hydraulic unit 57, a cylinder 55 disposed in the chamber 41 of the second rotary shaft 21 and a piston 54 provided on the movable shaft 34 and housed in a cylinder 55. Between the piston 52 and a bottom wall 55a of the cylinder 55, there is an oil chamber 56 into which a pressurized oil is supplied, and from which the oil is discharged, by the hydraulic unit 57 via the schematically illustrated oil supply path 57a. The hydraulic unit 57 can be of a small size since the movable shaft 34 and the connector gear 32 are small and the spring 53 has a small spring constant. When the hydraulic unit 57 is actuated to supply pressurized oil to the oil chamber 56, the piston 54, and the movable shaft 34 and the connector gear 32 therewith, is pushed by oil pressure in the direction Q so that the connector gear 32 is released from engagement with the driving gear 30, thereby disconnecting the driving gear 30 from the driven gear 31.

Figure 4:
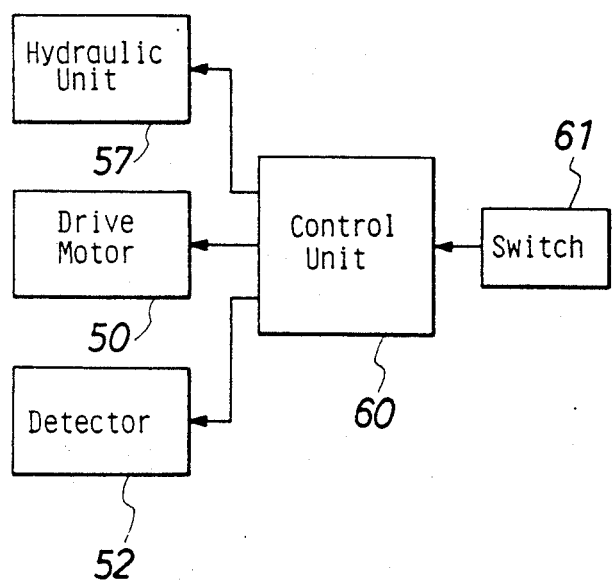
FIG. 4 is a block diagram showing the automatic control system for the press according to the invention.

Referring to FIG. 4 the control unit 60 for automatically connecting and disconnecting the gears 30 and 31 provides automatic control of the hydraulic unit 57, the drive motor 50a, etc. The function of the control unit 60 will be described in detail hereinafter with reference to the flow chart in FIG. 5.

Figure 5:
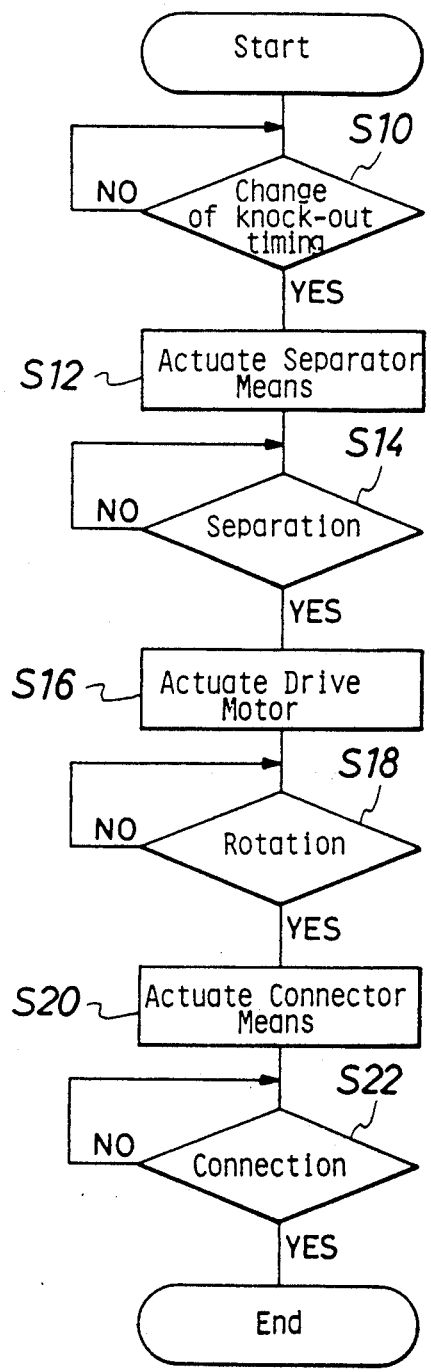
FIG. 5 is a flow chart showing the operation of the control system of FIG. 4.
Figure 6:
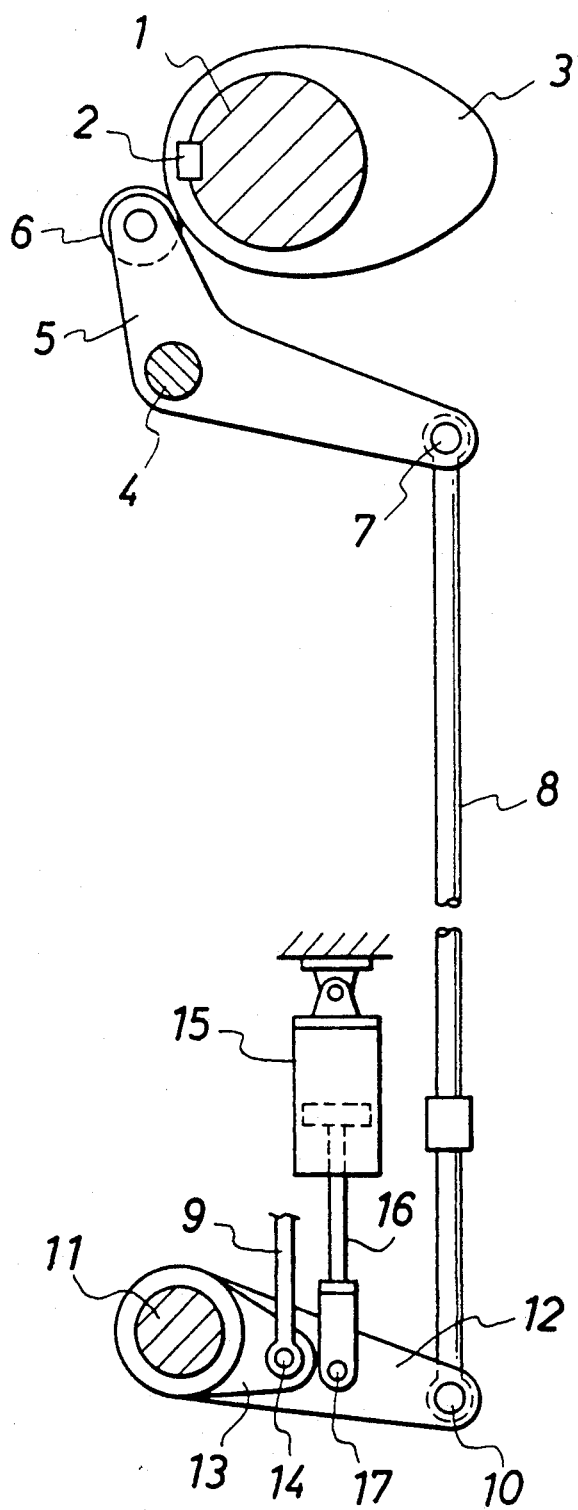
FIG. 6 shows a conventional knock-out mechanism.

Referring to FIG. 5, upon receipt by the control unit 60 through a switch 61 of a command for a change in the knock-out timing (step S10), the control unit 60 directs a rotation of the first rotary shaft 20 together with the second rotary shaft 21 to a desired angular position at which the rotation of the shafts 20 and 21 is stopped. Next, the control unit 60 actuates the hydraulic unit 57 to supply the pressurized oil to the oil chamber 56 so as to operate the separator means 36 (step S12), whereupon the movable shaft 34 moves in the direction Q against the elastic force of the spring 53. As a result, the connector gear 32 is disengaged from the driving gear 30 which is then disconnected from the driven gear 31. Disconnection of the gears 30 and 31 is detected by the detector 52 and indicates the ON condition (step S14).

When the gears 30 and 31 are disconnected and the second rotary shaft 21 (with the drive cam 27) is therefore separated from the first rotary shaft 20, the control unit 60 actuates the drive motor 50a so that the second rotary shaft 21 rotates by an angle corresponding to the change in the knock-out timing input by the switch 61 (step S16). At that time, an encoder, not shown, indicates how much the second rotary shaft 21 is rotated, thus allowing the shaft 21 to be precisely rotated by a predetermined angle (step S18).

When the second rotary shaft 21 with the drive cam 27 has been rotated by the predetermined angle relative to the first rotary shaft 20, the control unit 60 actuates the hydraulic unit 57 to discharge the pressurized oil from the oil chamber 54 so as to deactivate the separator means 36 (step S20). As a result, the connector means 35 in the form of the spring 53 is free to apply its elastic force to move the connector gear 32 into engagement with driving gear 30 and thereby connect the driven gear 31 with the driving gear 30. The connection between the gears 30 and 31 is detected by the detector 52 by indicating the OFF condition (step S22). Moreover, this connection is maintained by the elastic force of the spring 53.

By rotating only the second rotary shaft 21 (with the drive cam 27) forward or backward by said predetermined angle while it is separate from the first rotary shaft 20 and then connecting them together, it is possible to adjust the rotational phase difference between them. Consequently, the knock-out timing can be advanced or delayed.

Some of the advantages of the invention may be summarized as follows: As is apparent from the above description of the first embodiment of the invention, no mechanical assembly or disassembly are required in order to adjust the knock-out timing. Further, in the first embodiment, separating the first and second rotary shaft 20 and 21 in order to perform the adjustment is performed not by displacing the second rotary shaft 21 relative to the first rotary shaft 20, but rather by displacing the movable shaft 34 carrying the connector gear 32 which can be much lighter in weight. Therefore, the power required for performing the adjustment need not be high and the structure need not be complex. Still further, since the relative rotational angle between the first and second rotary shafts 20 and 21 and changes in that angle are determined by the pitch of gears, by changing the pitch (changing the gears), it is possible to set the rotational angle at any desired angle for adjustment of the knock-out timing.

Figure 2:
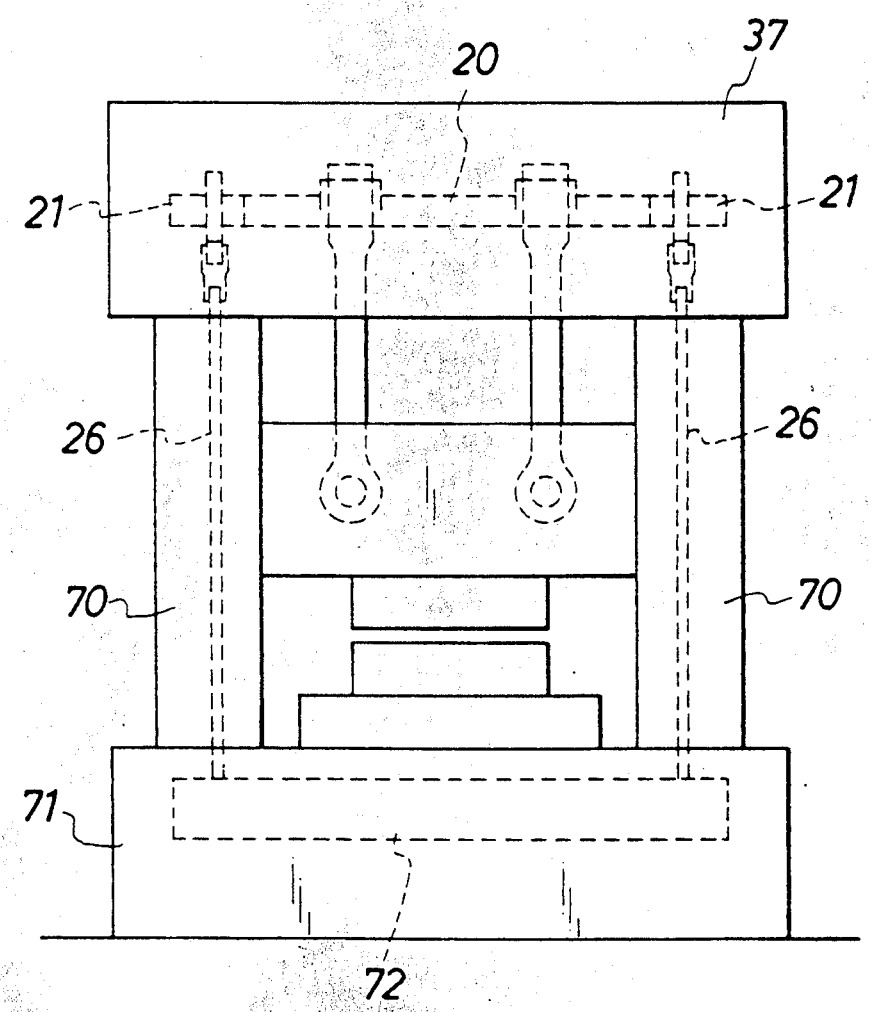
FIG. 2 is a schematic view of major parts of a press machine according another embodiment of the invention.
Figure 3:
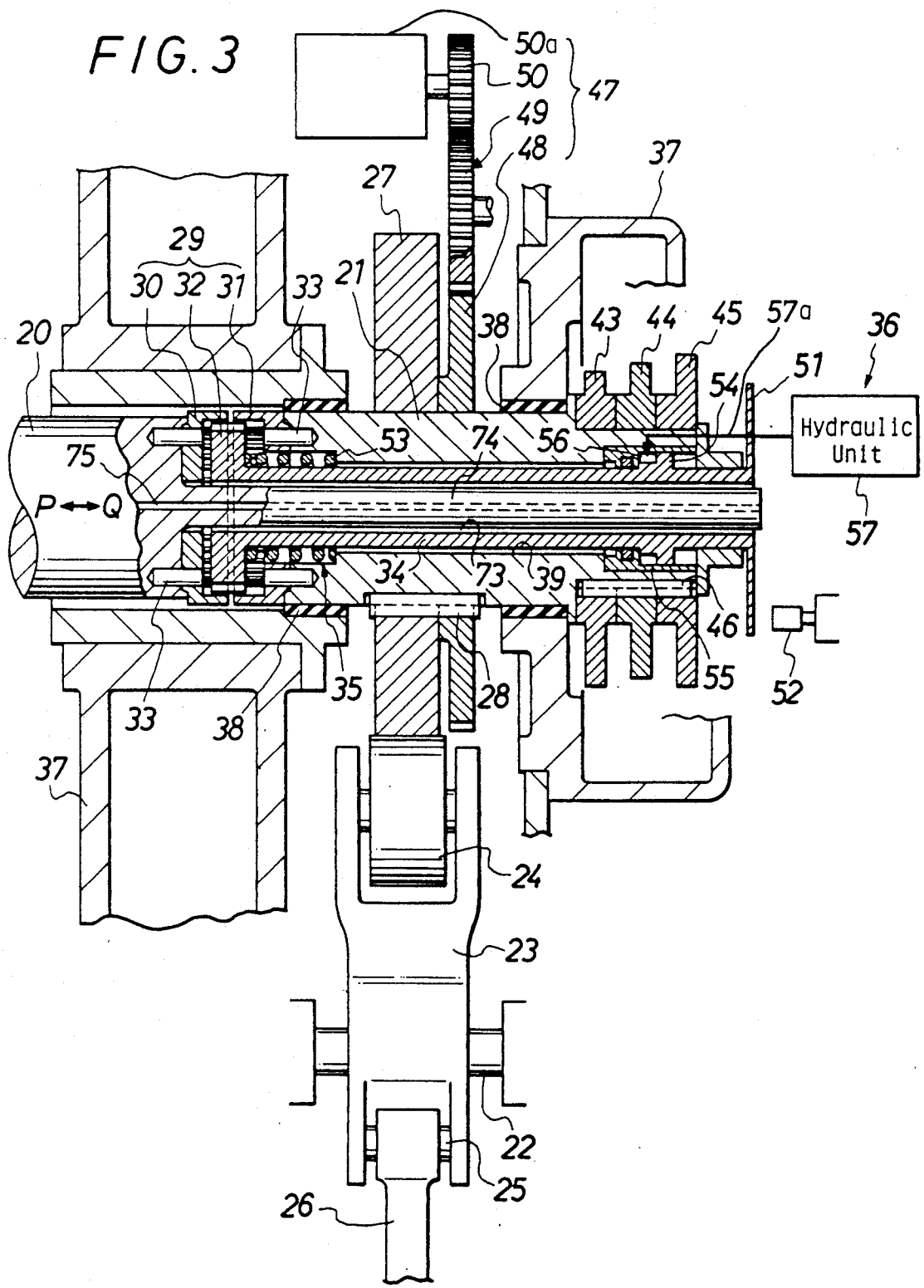
FIG. 3 is a partially sectional and partially schematic view similar to FIG. 1 of a portion of the embodiment of the press machine of FIG. 2.

In FIGS. 2 and 3, there is illustrated a second embodiment for use in a super-large press. For example, in the case of a 3,000-ton class press requiring approximately a 200 ton knock-out force, the cam for driving the knock-out pin must naturally be large in order to have the corresponding strength to sustain such a force. Such a press requires a smoother supply of the lubricating oil than would be provided by the first embodiment.

In the second embodiment, the first rotary shaft 20 is connected with a respective second rotary shaft 21 on each of its two ends, as shown in FIG. 2, in order to reduce the knock-out force to be transmitted be each of the shafts 21 individually and also to supply the lubricating oil smoothly. In FIG. 2, reference the numerals 70 designate press columns, the numeral 71 designates a bed, and numeral 72 designates a knock-out unit including a knock-out pin.

As the shafts 21 are substantially identical only one is illustrated in detail in FIG. 3 for the sake of simplicity. Referring to FIG. 3, in order for the lubricating oil to be supplied smoothly, the movable shaft 34 of the second embodiment is formed as a hollow shaft having an axial bore 73 and the first rotary shaft 20 has an end portion 74 of a smaller diameter than that of the bore 73. The end portion 74 of the shaft 20 has an oil passageway 75 therein and is inserted in the bore 73 for relative axial movement. This arrangement allows the lubricating oil to be supplied via passageway 75 to the first rotary shaft 20 and other parts.

The invention, now being fully described, it will be apparent to one of ordinary skill in the art that many changes and modifications can be made thereto without departing from the spirit or scope of the invention as set forth herein. For example, although according to the first and second embodiments, the knock-out timing is adjusted by rotating the second rotary shaft or shafts 21 while keeping the first rotary shaft 20 still and separated, alternatively the first rotary shaft 20 may be rotated while the or each second rotary shaft 21 is still.

Further, while in the first and second embodiments, the connector means 35 uses as a biasing means a spring 53 mounted in the larger recess 40 of the or each second rotary shaft 21, the connector means 35 need not use a spring but may instead use pneumatic or hydraulic pressure as the biasing means. In addition, while the first and second embodiments include the control means 60 to perform operations fully automatically, it is contemplated that operation of the separator means and rotation of the second rotary shaft 21 be performed manually or semi-automatically. In that case, the control means 60 may be a much simpler structure or may be omitted altogether. Further, while the drive cam 27 and the second rotary shaft 21 are separate members connected together by a key in the illustrated embodiments, it is also contemplated that they may be formed as a single unit.

The driving mechanism 47 is a device for rotating the second rotary shaft 21 while the clutch 29 is in separate condition. Therefore, the second rotary shaft 21 separates from the first rotary shaft 20 and thereafter the motor 50a is driven to rotate the second rotary shaft 21 through gears 50, 49 and 48. On the other hand, the first and second rotary shafts, 20 and 21, are connected with each other in the normal press operation, whereby the gears are rotated by the second rotary shaft. So, it is necessary to separate the motor 50a from the gear series in case of the normal press operation.

In the embodiment, there is an electro-magnetic clutch, not shown, between the drive shaft of the motor 50a and the gear 50, which clutch is adapted to be in "ON" condition only when the motor 50a is driven and "OFF" condition in case of the normal press operation.

What is claimed is:

1. An apparatus for adjustment of knock-out timing for a press having a drive shaft, comprising:
   a first rotary shaft for synchronously rotating with the drive shaft;
   a second rotary shaft coaxial with said first rotary shaft;
   a drive cam mounted to said second rotary shaft for driving a knock-out mechanism;
   a clutch, disposed at connecting surfaces between said first and second rotary shafts, and shiftable between an engaged condition in which said clutch connects said first and second rotary shafts together and a disengaged condition in which said first and second shafts are disconnected, said clutch comprising a driving gear, a driven gear and a connector gear, said driving and driven gears being internal gears which are mounted at said connecting surfaces and said connector gear being an external gear which is mounted axially movable with respect to said first and second rotary shafts between a first position in engagement with both said driving gear and said driven gear and a second position disengaged from one of said driving gear and said driven gear;
   a connector means for shifting said clutch into said engaged condition;
   a separator means for shifting said clutch from said engaged condition into said disengaged condition; and
   a rotating means for rotating only one of said first rotary shaft and said second rotary shaft, while said clutch is in said disengaged condition.

2. An apparatus as claimed in claim 1, further comprising an axially movable shaft mounted to said connector gear, wherein said connector means is a spring biasing said movable shaft toward a direction of engagement with said driving and driven gears.

3. An apparatus as claimed in claim 1, further comprising an axially movable shaft mounted to said connector gear, wherein said movable shaft has a piston thereon, said second rotary shaft having an oil chamber formed therein for housing said movable shaft and said piston, said separator means including a hydraulic unit for supplying pressurized oil to said oil chamber so as to bias said connector gear in a direction of disengagement from at least one of said driving and driven gears.

4. An apparatus as claimed in claim 1, further comprising an axially movable shaft, said connector gear being mounted to one end thereof so as to be axially movable therewith, wherein said separator means comprises a disc mounted at an end of said movable shaft opposite said one end and means for detecting a movement of said disc in a direction of disengagement of said connector gear from at least one of said driving and driven gears so as to detect a disengagement of said connector gear from said one of said driving and driven gears upon movement of said movable shaft and said connector gear therewith in said direction of disengagement.

5. An apparatus as claimed in claim 1, further comprising
   a control unit, and
   an axially movable shaft, said connector gear being mounted to one end thereof so as to be axially movable therewith, wherein said separator means comprises a disc mounted at an end of said movable shaft opposite said one end and means for detecting a movement of said disc in a direction of disengagement of said connector gear from at least one of said driving and driven gears so as to detect a disengagement of said connector gear from said one of said driving and driven gears upon movement of said movable shaft and said connector gear therewith in said direction of disengagement, said movable shaft having a piston thereon, said second rotary shaft having an oil chamber formed therein for housing said movable shaft and said piston, said separator means including a hydraulic unit for supplying pressurized oil to said oil chamber so as to bias said connector gear in a direction of disengagement from at least one of said driving and driven gears, said control unit having means for automatically controlling said hydraulic unit and said drive motor and being responsive to said detecting means.

6. An apparatus as claimed in claim 1, further comprising removable pins connecting said driving and driven gears at the connecting surfaces between said first and second rotary shafts.

7. An apparatus as claimed in claim 1, further comprising a hollow, axially movable shaft mounted to said connector gear and having a bore therein of given inside diameter, wherein said first rotary shaft has a shaft portion in said bore, said shaft portion having an outside diameter less than said inside diameter, being axially movable in said bore, and having an oil passageway therein for supplying lubricating oil to parts of said apparatus including said first rotary shaft.

8. An apparatus for adjustment of knock-out timing for a press having a drive shaft, comprising:
   a first rotary shaft for synchronously rotating with the drive shaft;
   a second rotary shaft coaxial with said first rotary shaft;
   a drive cam mounted to said second rotary shaft for driving a knock-out mechanism;
   a clutch, disposed at connecting surfaces between said first and second rotary shafts, and shiftable between an engaged condition in which said clutch connects said first and second rotary shafts together and a disengaged condition in which said first and second shafts are disconnected;
   a connector means for shifting said clutch into said engaged condition;
   a separator means for shifting said clutch from said engaged condition into said disengaged condition; and
   a rotating means for rotating only one of said first rotary shaft and said second rotary shaft, while said clutch is in said disengaged condition, said rotating means comprising a gear series, a further gear mounted to said second rotary shaft, and a drive motor for rotating said further gear through a gear series.

9. An apparatus for adjustment of knock-out timing for a press having a drive shaft, comprising:
   a first rotary shaft for synchronously rotating with the drive shaft;
   a second rotary shaft coaxial with said first rotary shaft, said second rotary shaft being disposed at one end of said first rotary shaft;
   a drive cam mounted to said second rotary shaft for driving a knock-out mechanism;
   a clutch, disposed at connecting surfaces between said first and second rotary shafts, and shiftable between an engaged condition in which said clutch connects said first and second rotary shafts together and a disengaged condition in which said first and second shafts are disconnected;
   a connector means for shifting said clutch into said engaged condition;
   a separator means for shifting said clutch from said engaged condition into said disengaged condition;
   a rotating means for rotating only one of said first rotary shaft and said second rotary shaft, while said clutch is in said disengaged condition;
   a third rotary shaft axially aligned and disposed at an other end of said first rotary shaft opposite said one end;
   a further drive cam mounted to said third rotary shaft for driving the knock-out mechanism;
   a further clutch mounted at connecting surfaces between said first and third rotary shafts so as to be shiftable between an engaged condition in which said further clutch connects said first condition in which said second rotary shaft and a disengaged condition in which said first and third rotary shafts are disconnected from each other;
   a further connector means for putting said further clutch in said engaged condition;
   a further separator means for shifting said further clutch from said engaged condition into said disengaged condition; and
   a further rotating means for rotating only one of said first rotary shaft and said third rotary shaft while said further clutch is in said disengaged condition.

* * * * *